(12) United States Patent
Brown et al.

(10) Patent No.: US 6,351,749 B1
(45) Date of Patent: Feb. 26, 2002

(54) MULTI-THREADING, MULTI-TASKING ARCHITECTURE FOR A RELATIONAL DATABASE MANAGEMENT SYSTEM

(75) Inventors: Douglas P. Brown, Rancho Santa Fe; Allen N. Diaz, Santa Ana; Donald R. Pederson, San Diego, all of CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/410,389

(22) Filed: Sep. 30, 1999

(51) Int. Cl.⁷ .............................................. G06F 17/30
(52) U.S. Cl. .............................. 707/10; 707/8; 707/101; 707/104.1
(58) Field of Search ............................... 707/8, 10, 101, 707/104.1

(56) References Cited

U.S. PATENT DOCUMENTS

| | | | |
|---|---|---|---|
| 5,590,326 A | * 12/1996 | Manabe | 711/150 |
| 5,754,772 A | * 5/1998 | Leaf | 709/203 |
| 5,819,273 A | * 10/1998 | Vora et al. | 707/10 |
| 6,016,490 A | * 1/2000 | Watanabe et al. | 707/8 |
| 6,222,533 B1 | * 4/2001 | Notani et al. | 345/329 |

FOREIGN PATENT DOCUMENTS

EP 0 625 756 A 11/1994

OTHER PUBLICATIONS

Anonynous: "Algorithm to Connect Clients to a Database Server Based on the Transmission Control Protocol/Internet Protocol Sockets"; IBM Technical Disclosure Bulletin, vol. 37, No. 7, Jul. 1, 1994, pp. 305–308, XP002157113, New York, US.

Naecker P.A.: "Interbase (DBMS)"; DEC Professional, vol. 6, No. 8, Aug. 1987, pp. 82–92, XP000979613 (USA).

* cited by examiner

Primary Examiner—Thomas Black
Assistant Examiner—Charles L. Rones
(74) Attorney, Agent, or Firm—Gates & Cooper

(57) ABSTRACT

A parallel processing architecture for a relational database management system (RDBMS) that supports both a process model operating system and a thread model operating system. The RDBMS is implemented as a shared nothing, single database image utilizing Parallel Database Extensions (PDEs) that insulate the RDBMS from the specifics of the operating system and that provide the necessary techniques for accessing common memory segments.

18 Claims, 2 Drawing Sheets

MULTI-THREADING, MULTI-TASKING ARCHITECTURE FOR A RELATIONAL DATABASE MANAGEMENT SYSTEM

BACKGROUND OF THE INVENTION

1. Field of the Invention.

This invention relates in general to a relational database management system, and in particular, to a multi-threaded, multi-tasking architecture for a relational database management system.

2. Description of Related Art.

The purpose of this invention is to enable a parallel processing relational database management system (RDBMS) to execute on both WINDOWS NT™ and UNIX MP-RAS™ operating systems for both symmetric multi-processing (SMP) and massively parallel processing (MPP) hardware architectures. The problem for the RDBMS is to design it in such a manner as to allow the RDBMS to execute independent of operating system models, i.e., regardless of whether the operating system provides a thread model (WINDOWS NT) or process model (UNIX MP-RAS).

This is significant because the RDBMS was originally designed to work only with process models. Given this consideration, and the demand for the RDBMS to work under a thread model (WINDOWS NT); it can be seen that the RDBMS needed to be operating system independent. In other words, the RDBMS need to be designed in such a manner that a separate version of the RDBMS need not be developed and maintained for every new operating system or platform that becomes available.

SUMMARY OF THE INVENTION

To overcome the limitations in the prior art described above, and to overcome other limitations that will become apparent upon reading and understanding the present specification, the present invention discloses a parallel processing architecture for a relational database management system (RDBMS) that supports both a process model operating system and a thread model operating system. The RDBMS is implemented as a shared nothing, single database image utilizing Parallel Database Extensions (PDEs) that insulate the RDBMS from the specifics of the operating system and that provide the necessary techniques for accessing common memory segments.

An object of the present invention is to provide more efficient usage of parallel processor computer systems. Another object of the present invention is to provide a foundation for multi-threaded, multi-tasking relational database management systems. Still another object of the present invention is to provide a portable relational database management system that can run under different operating system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

OVERVIEW

Extensive changes in a parallel processing architecture for a relational database management system (RDBMS) are made to support the differences between the process model, which is currently used for the UNIX MP-RAS™ operating system, and the thread model, which is used for the WINDOWS NT™ operating system. The key concept introduced in the present invention is that the RDBMS is implemented as a shared nothing single database image (threads or processes), utilizing Parallel Database Extensions (PDEs) that insulate the RDBMS from the specifics of the operating system and that permit various tasks to access common memory segments. Thus, the RDBMS is portable and may be used with different operating systems and different hardware environments.

HARDWARE ENVIRONMENT

Figure 1:
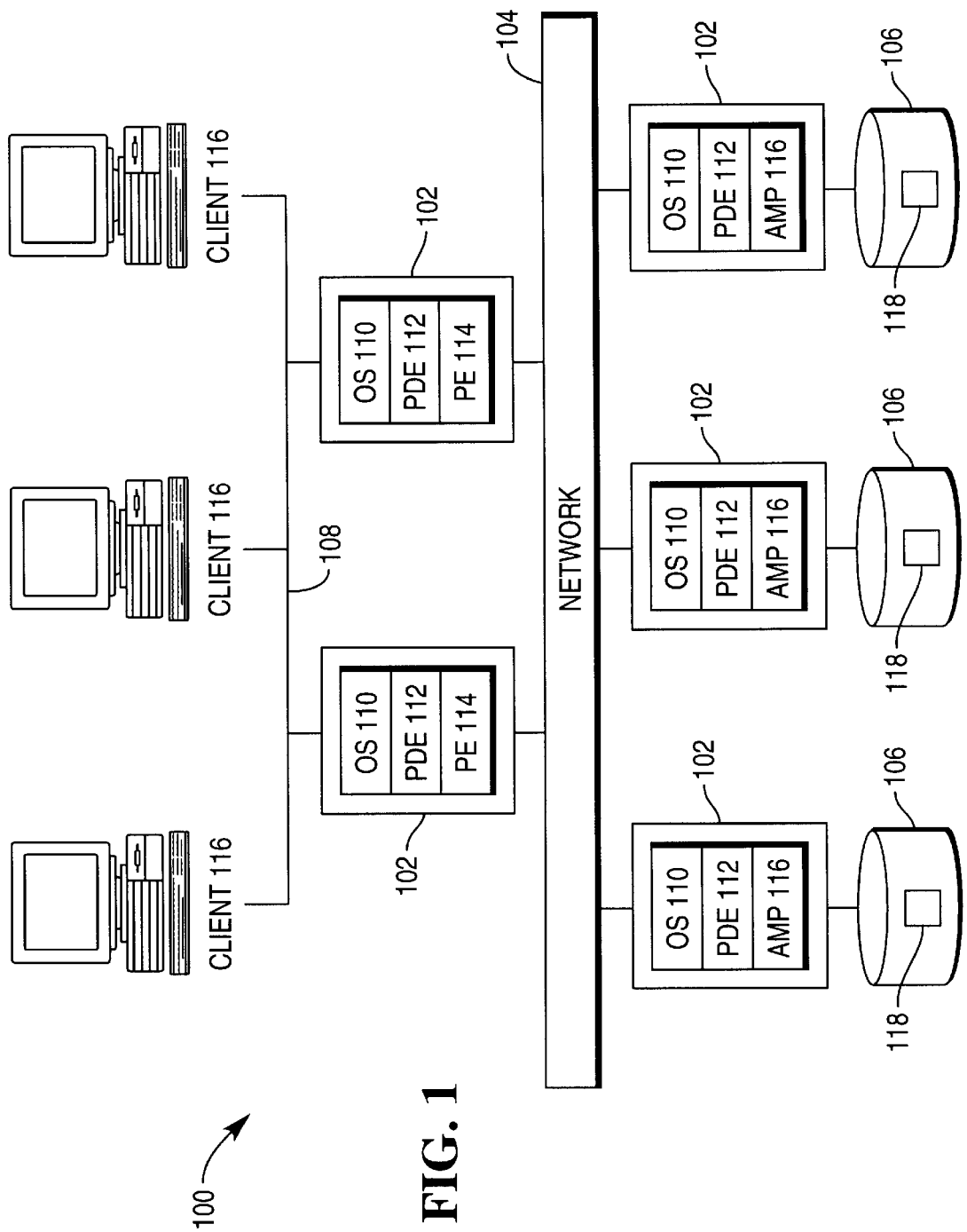
FIG. 1 is a block diagram that illustrates an exemplary computer hardware and software environment that could be used with the preferred embodiment of the present invention.

FIG. 1 is a block diagram that illustrates an exemplary computer hardware and software environment that could be used with the preferred embodiment of the present invention. In the exemplary computer hardware environment, a massively parallel processing (MPP) computer system 100 is comprised of one or more processors or nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units (DSUs) 106 and one or more data communications units (DCUs) 108, as is well known in the art.

Each of the nodes 102 operates under the control of an operating system (OS) 110, such as the WINDOWS NT™ or UNIX™ MP-RAS operating systems. Further, the OS 110 controls the execution of a shared-nothing, single-image relational database management system (RDBMS) comprised of Parallel Database Extensions (PDEs) 112, Parsing Engines (PEs) 114, and Access Module Processors (AMPs) 116.

The PDEs 112 provides a high speed, low latency, message-passing layer for use in communicating between the PEs 114 and AMPs 116. Further, the PDE 114 is an application programing interface (API) that allows the RDBMS to operate under either UNIX MP-RAS or WINDOWS NT, in that the PDE 114 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. Both the PEs 114 and AMPs 116 are known as "virtual processors" or "vprocs".

The vproc concept is accomplished by executing multiple threads or processes in a node 102, wherein each thread or process is encapsulated within a vproc. The vproc concept adds a level of abstraction between the multi-threading of a work unit and the physical layout of the parallel processor computer system 100. Moreover, when a node 102 comprises a plurality of processors, the vproc provides for intra-node 102 as well as the inter-node 102 parallelism.

The vproc concept results in better system 100 availability without undue programming overhead. The vprocs also provide a degree of location transparency, in that vprocs with each other using addresses that are vproc-specific, rather than node-specific. Further, vprocs facilitate redundancy by providing a level of isolation/abstraction between the physical node 102 and the thread or process. The result is increased system 100 utilization and fault tolerance.

Work is divided among the nodes 102 in the system 100 by spreading the storage of the rows of each table in a database 118 across all of the AMPs 116 and the DSUs 106 (which are managed by the AMPs 116). Thus, each DSU 106 stores some of the rows of each table in the database 118 and work is managed by the system 100 so that the task of operating on the rows is performed by the AMP 116 managing the DSUs 106 that store the specific rows. Similarly, the PEs 114 fully parallelize all functions among the AMPs 116. As a result, the system of FIG. 1 applies a multiple instruction stream, multiple data stream (MIMD) concurrent processing architecture to implement the RDBMS.

Generally, the OS 110, PDEs 112, PEs 114, and AMPs 116 are tangibly embodied in and/or accessible from RAM, ROM, one or more of the DSUs 106, and/or a remote device coupled to the computer system 100 via one or more of the DCUs 108. The OS 110, PDEs 112, PEs 114, and AMPs 116 each comprise logic and/or data which, when read and executed by the computer system 100, causes the computer system 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

THREAD AND PROCESS MODELS

A number of different issues are involved in making the RDBMS available to run under both WINDOWS NT and UNIX MP-RAS operating systems. The most important of these issues relates to the use of process or thread models, and the resultant impact on techniques for accessing common memory segments. Currently, the process model is used for UNIX MP-RAS, and the thread model is used for WINDOWS NT.

In the process model, each vproc is a collection of processes. Each process, also referred to as a task, is a separate executable and address space. Each process is associated with a partition, wherein the partition is a set of processes with similar functionality. Parent and child relationships exist between processes in a partition; however, each process has its own virtual address space. Generally, a PE 114 or AMP 116 vproc is comprised of multiple processes.

In the thread model, each vproc is a collection of one or more threads. Each thread, also referred to as a task, shares the same executable and address space. Each thread uses its own set of registers and has its own stack, which is allocated from a region of the owning process's address space. Local and automatic variables are created on the thread's stack, but static and global variables are created from a memory region that is accessible to all threads in a process. Each thread is associated with a partition, wherein the partition is a single process that may support multiple threads with similar functionality. Parent and child relationships exist between threads in a partition. Generally, a PE 114 or AMP 116 vproc is comprised of multiple threads. On the other hand, a traditional UNIX process can be thought of as a process with a single thread.

While it is possible to implement the RDBMS on WINDOWS NT using the process model in a manner similar to UNIX MP-RAS, the thread model is used instead on WINDOWS NT, because multiple threads executing within a single process address space use fewer system resources than multiple processes executing in multiple address spaces. For example, thread switches are more efficient than process switches, because threads share the same address space.

PARTITION GLOBAL AND TASK GLOBAL SEGMENTS

Figure 2:
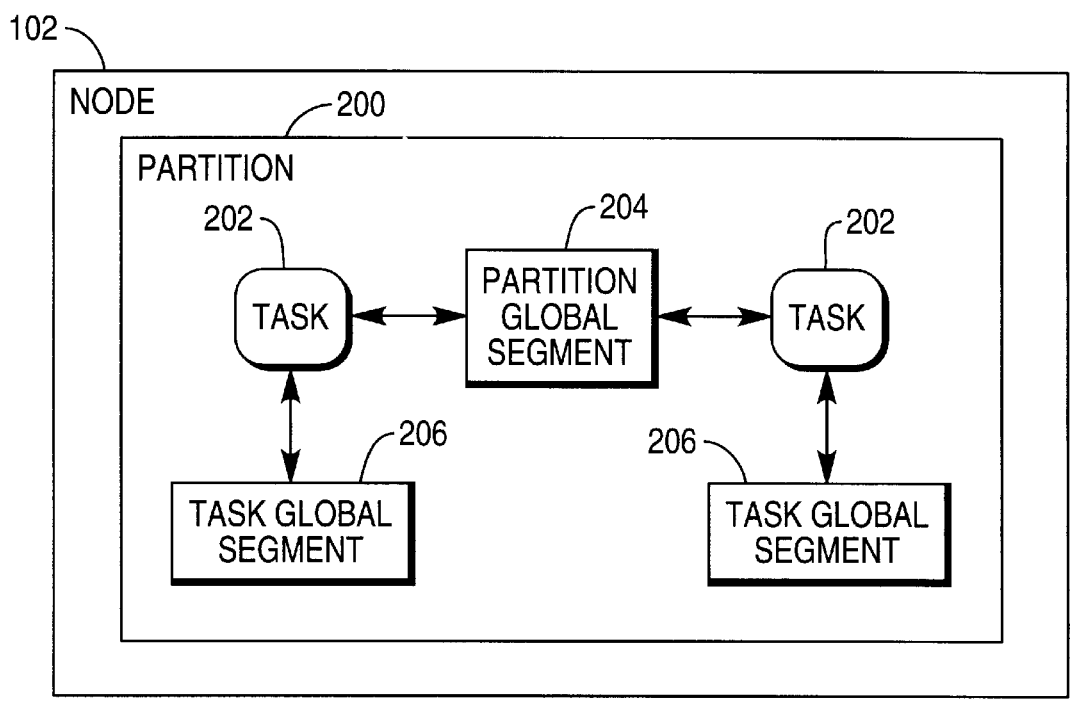
FIG. 2 is a block diagram that illustrates the use of memory spaces according to the preferred embodiment of the present invention.

FIG. 2 is a block diagram that illustrates the use of memory segments according to the preferred embodiment of the present invention. As noted above, a partition 200 may be comprised of one or more tasks 202. All of the tasks 202 share access to a Partition Global Segment 204, and each of the tasks 202 has exclusive access to a Task Global Segment 206. Access is gained to these segments via the PDE 112, and the access techniques differ according to whether the OS 110 provides a thread model or process model.

In a process model OS 110, fixed virtual addresses within the process' address space can be used to point to the segments 204, 206. In this embodiment, the PDE 112 is modified to reserve a region of the process address space for the fixed virtual addresses. The virtual addresses are guaranteed to be the same for each process.

In a thread model OS 110, the shared address space of a multi-threaded process requires the use of thread-local data types to access the segments 204, 206. As a result, to maintain information that is thread-specific, the PDE 112 is modified to use either dynamic or static thread-local storage, which associates data with a specific thread of execution within the process. Static thread-local storage can be used if the variable is not accessed outside of the dynamic link library (DLL) where it is defined; dynamic thread-local storage allows a variable's contents to be thread specific, and also allows the variable to be referenced across DLLs.

LOGIC OF THE PREFERRED EMBODIMENT

Figure 3:
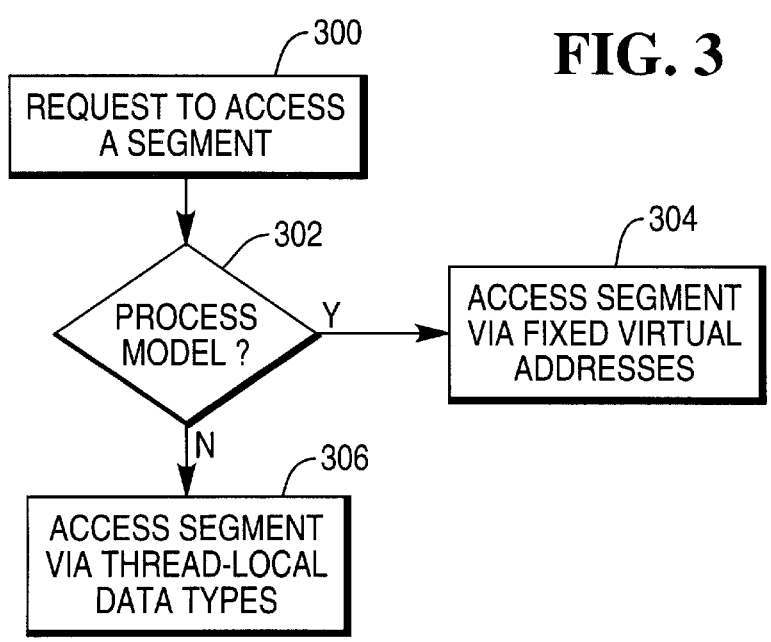
FIG. 3 is a flow chart illustrating the steps necessary for the interpretation and execution of logic according to the present invention.

FIG. 3 is a flow chart illustrating the steps necessary for the interpretation and execution of logic according to the preferred embodiment of the present invention. Although the preferred embodiment uses a specific sequence of steps, those skilled in the art will recognize that the invention disclosed herein may use any number of different steps, so long as similar functions are provided.

Block 300 represents the PDE 112 receiving a request from a PE 114 or AMP 116 vproc to access a segment 204, 206. Block 302 represents the PDE 112 determining whether a process model is being used by the OS 110. If so, control transfers to Block 304, which represents the PDE 112 accessing the segment 204, 206 by means of fixed virtual addresses in the process model OS 110; otherwise, control transfers to Block 306, which represents the PDE 112 accessing the segment 204, 206 by means of thread-local data types in the thread model OS 110.

Those skilled in the art will also recognize that the selection of which logic to use, i.e., either process or thread model logic, could be performed at compilation or could be performed during execution. In other words, the source for the PDE 112, PE 114, and AMP 116 could include toggles that select the desired logic at compilation time. Alternatively, the PDE 112, PE 114, and AMP 116 could include logic that recognizes the type of OS 110 during execution and selects the correct logic accordingly.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, programs other than relational database management systems could benefit from the present invention.

In summary, the present invention discloses a parallel processing architecture for a relational database management system (RDBMS) that supports both a process model operating system and a thread model operating system. The RDBMS is implemented as a shared nothing, single database image utilizing Parallel Database Extensions (PDEs) that insulate the RDBMS from the specifics of the operating system and that provide the necessary techniques for accessing common memory segments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for executing an application in a computer system, comprising:
   (a) an application comprised of a plurality of tasks, wherein the tasks are selected from a group comprising a plurality of processes or a plurality of threads within a process depending on an operating system, the tasks comprise a plurality of processes under a process model operating system, and the tasks comprise a plurality of threads within a process under a thread model operating system; and
   (b) a layer for insulating the application from the specifics of the operating system, wherein the layer provides mechanisms for the application to access memory segments under either the process or thread model operating system.

2. A method of implementing a multi-threaded, multi-tasking architecture for a relational database management system, comprising the steps of:
   (a) executing a relational database management system (RDBMS) in a computer system, wherein the RDBMS is comprised of a plurality of tasks, the tasks are selected from a group comprising a plurality of processes or a plurality of threads within a process depending on an operating system, and the tasks comprise a plurality of processes under a process model operating system and the tasks comprise a plurality of threads within a process under a thread model operating system; and
   (b) executing a layer for insulating the RDBMS from the specifics of the operating system in the computer system, wherein the layer provides mechanisms for the RDBMS to access memory segments under either the process or thread model operating system.

3. An article of manufacture embodying logic for implementing a multi-threaded, multi-tasking architecture for a relational database management system, the method comprising the steps of:
   (a) executing a relational database management system (RDBMS) in a computer system, wherein the RDBMS is comprised of a plurality of tasks, the tasks are selected from a group comprising a plurality of processes or a plurality of threads within a process depending on an operating system, and the tasks comprise a plurality of processes under a process model operating system and the tasks comprise a plurality of threads within a process under a thread model operating system; and
   (b) executing a layer for insulating the RDBMS from the specifics of the operating system in the computer system, wherein the layer provides mechanisms for the RDBMS to access memory segments under either the process or thread model operating system.

4. An article of manufacture embodying logic for implementing an application in a computer system, the method comprising the steps of:
   (a) executing an application in a computer system, wherein the application is comprised of a plurality of tasks, the tasks are selected from a group comprising a plurality of processes or a plurality of threads within a process depending on an operating system, and the tasks comprise a plurality of processes under a process model operating system and the tasks comprise a plurality of threads within a process under a thread model operating system; and
   (b) executing a layer for insulating the application from the specifics of the operating system in the computer system, wherein the layer provides mechanisms for the application to access memory segments under either the process or thread model operating system.

5. A method of implementing an application in a computer system, comprising the steps of:
   (a) executing an application in a computer system, wherein the application is comprised of a plurality of tasks, the tasks are selected from a group comprising a plurality of processes or a plurality of threads within a process depending on an operating system, and the tasks comprise a plurality of processes under a process model operating system and the tasks comprise a plurality of threads within a process under a thread model operating system; and
   (b) executing a layer for insulating the application from the specifics of the operating system in the computer system, wherein the layer provides mechanisms for the application to access memory segments under either the process or thread model operating system.

6. A multi-threaded, multi-tasking architecture for a relational database management system, comprising:
   (a) a relational database management system (RDBMS) comprised of a plurality of tasks, wherein the tasks are selected from a group comprising a plurality of processes or a plurality of threads within a process depending on an operating system, the tasks comprise a plurality of processes under a process model operating system, and the tasks comprise a plurality of threads within a process under a thread model operating system; and (b) a layer for insulating the RDBMS from the specifics of the operating system, wherein the layer provides mechanisms for the RDBMS to access memory segments under either the process or thread model operating system.

7. The multi-threaded, multi-tasking architecture of claim 6, wherein the RDBMS is comprised of one or more partitions under the process model operating system, each partition is comprised of a plurality of processes, and each process is comprised of a separate executable and address space.

8. The multi-threaded, multi-tasking architecture of claim 6, wherein the RDBMS is comprised of one or more partitions under the thread model operating system, each partition is comprised of a plurality of threads, and each thread shares an executable and address space of a process.

9. The multi-threaded, multi-tasking architecture of claim 8, wherein each thread uses its own set of registers and has its own stack, which are allocated from a region of the process's address space.

10. The multi-threaded, multi-tasking architecture of claim 9, wherein local and automatic variables are created on the thread's stack.

11. The multi-threaded, multi-tasking architecture of claim 9, wherein static and global variables are created from a memory region that is accessible to all threads in the process.

12. The multi-threaded, multi-tasking architecture of claim 6, wherein each of the memory segments are selected from a group comprising a partition global segment and a task global segment.

13. The multi-threaded, multi-tasking architecture of claim 12, wherein all of the tasks in a partition share access to the partition global segment.

14. The multi-threaded, multi-tasking architecture of claim 12, wherein each of the tasks in a partition has exclusive access to the task global segment.

15. The multi-threaded, multi-tasking architecture of claim 12, wherein each of the tasks under the process model operating system uses fixed virtual addresses within the process' address space to access the memory segments.

16. The multi-threaded, multi-tasking architecture of claim 15, wherein the layer for insulating the RDBMS from the specifics of the operating system reserves a region of the process' address space for the fixed virtual addresses.

17. The multi-threaded, multi-tasking architecture of claim 12, wherein each of the tasks under the thread model operating system uses thread-local data types to access the memory segments.

18. The multi-threaded, multi-tasking architecture of claim 17, wherein the layer for insulating the RDBMS from the specifics of the operating system uses either dynamic or static thread-local storage, which associates data with a specific thread of execution within the process.

* * * * *